US011835988B2

(12) United States Patent
King (10) Patent No.: US 11,835,988 B2
(45) Date of Patent: Dec. 5, 2023

(54) SYSTEM AND METHOD FOR LOAD FUSION (71) Applicant: Advanced Micro Devices, Inc., Santa Clara, CA (US)

(72) Inventor: John M. King, Austin, TX (US)

(73) Assignee: Advanced Micro Devices, Inc., Santa Clara, CA (US)

(*) Notice: Subject to any disclaimer, the term of this patent is extended or adjusted under 35 U.S.C. 154(b) by 0 days.

(21) Appl. No.: 15/828,708

(22) Filed: Dec. 1, 2017

(65) Prior Publication Data

US 2019/0171452 A1  Jun. 6, 2019

(51) Int. Cl.
*G06F 9/30* (2018.01)
*G06F 9/24* (2006.01)
*G06F 9/38* (2018.01)
*G06F 9/34* (2018.01)

(52) U.S. Cl.
CPC .............. *G06F 9/3004* (2013.01); *G06F 9/24* (2013.01); *G06F 9/3017* (2013.01); *G06F 9/30021* (2013.01); *G06F 9/30043* (2013.01); *G06F 9/30181* (2013.01); *G06F 9/34* (2013.01); *G06F 9/384* (2013.01); *G06F 9/3842* (2013.01); *G06F 9/3867* (2013.01)

(58) Field of Classification Search
CPC .... G06F 9/3004; G06F 9/30043; G06F 9/384; G06F 9/24; G06F 9/30181; G06F 9/34; G06F 9/3842; G06F 9/3867
See application file for complete search history.

(56) References Cited

U.S. PATENT DOCUMENTS

| | | | | |
|---|---|---|---|---|
| 5,613,121 A | * | 3/1997 | Blainey ................... | G06F 8/443 717/151 |
| 6,920,546 B2 | * | 7/2005 | Gochman ............... | G06F 9/383 712/208 |
| 2004/0199755 A1 | * | 10/2004 | Sperber ............... | G06F 9/30145 712/244 |
| 2005/0027964 A1 | * | 2/2005 | Sperber ............... | G06F 9/30043 712/E9.03 |
| 2007/0038844 A1 | * | 2/2007 | Valentine .............. | G06F 9/3863 712/219 |
| 2012/0260072 A1 | * | 10/2012 | Wang ....................... | G06F 9/384 712/217 |
| 2018/0129498 A1 | * | 5/2018 | Levison .............. | G06F 9/30181 |

* cited by examiner

*Primary Examiner* — David J. Huisman
*Assistant Examiner* — Kasim Alli
(74) *Attorney, Agent, or Firm* — Volpe Koenig (57) ABSTRACT A system and method for load fusion fuses small load operations into fewer, larger load operations. The system detects that a pair of adjacent operations are consecutive load operations, where the adjacent micro-operations refers to micro-operations flowing through adjacent dispatch slots and the consecutive load micro-operations refers to both of the adjacent micro-operations being load micro-operations. The consecutive load operations are then reviewed to determine if the data sizes are the same and if the load operation addresses are consecutive. The two load operations are then fused together to form one load micro-operation with twice the data size and one load data micro-operation with no load component.

20 Claims, 5 Drawing Sheets

SYSTEM AND METHOD FOR LOAD FUSION

BACKGROUND

A processor generally has associated with it an instruction pipeline which includes fetching, decoding (or dispatching) and executing stages. The decoding stage retrieves an instruction from a fetch queue. If the fetched instruction is a load operation, queue entries are allocated in arithmetic logic unit (ALU) scheduler queues (ALSQs), address generation scheduler queues (AGSQs) and a load queue (LDQ).

BRIEF DESCRIPTION OF THE DRAWINGS

A more detailed understanding may be had from the following description, given by way of example in conjunction with the accompanying drawings wherein.

DETAILED DESCRIPTION

Processors generally operate pursuant to an instruction pipeline which includes fetching, decoding (or dispatching) and executing stages. The decoding or dispatching stage retrieves an instruction from a fetch queue. If the fetched instruction is a load micro-operation, queue entries are allocated in arithmetic logic unit (ALU) scheduler queues (ALSQs), address generation scheduler queues (AGSQs) and a load queue (LDQ). Each load micro-operation is performed independently.

Described herein is a system and method for load fusion that fuses small load micro-operations into fewer, larger load micro-operations. In particular, the system detects that adjacent micro-operations are consecutive load micro-operations, where the adjacent micro-operations refers to micro-operations flowing through adjacent dispatch slots and the consecutive load micro-operations refers to both of the adjacent micro-operations being load micro-operations. The consecutive load micro-operations are then reviewed to determine if the data sizes are the same and if the load micro-operation addresses are consecutive. The consecutive load micro-operations are fused together to form one load micro-operation with twice the data size if the above conditions are met. This increases performance by saving LDQ and AGSQ queue entries, and saves power by decreasing the number of address generations and load pipe flows that read from cache, for example. The load fusion system and method effectively realizes some of the IPC gain of an architecture with more load pipelines, without the disadvantages of building more pipelines, for example, added complexity, increased power requirement, and added difficulty in achieving higher frequency of operation.

Figure 1:
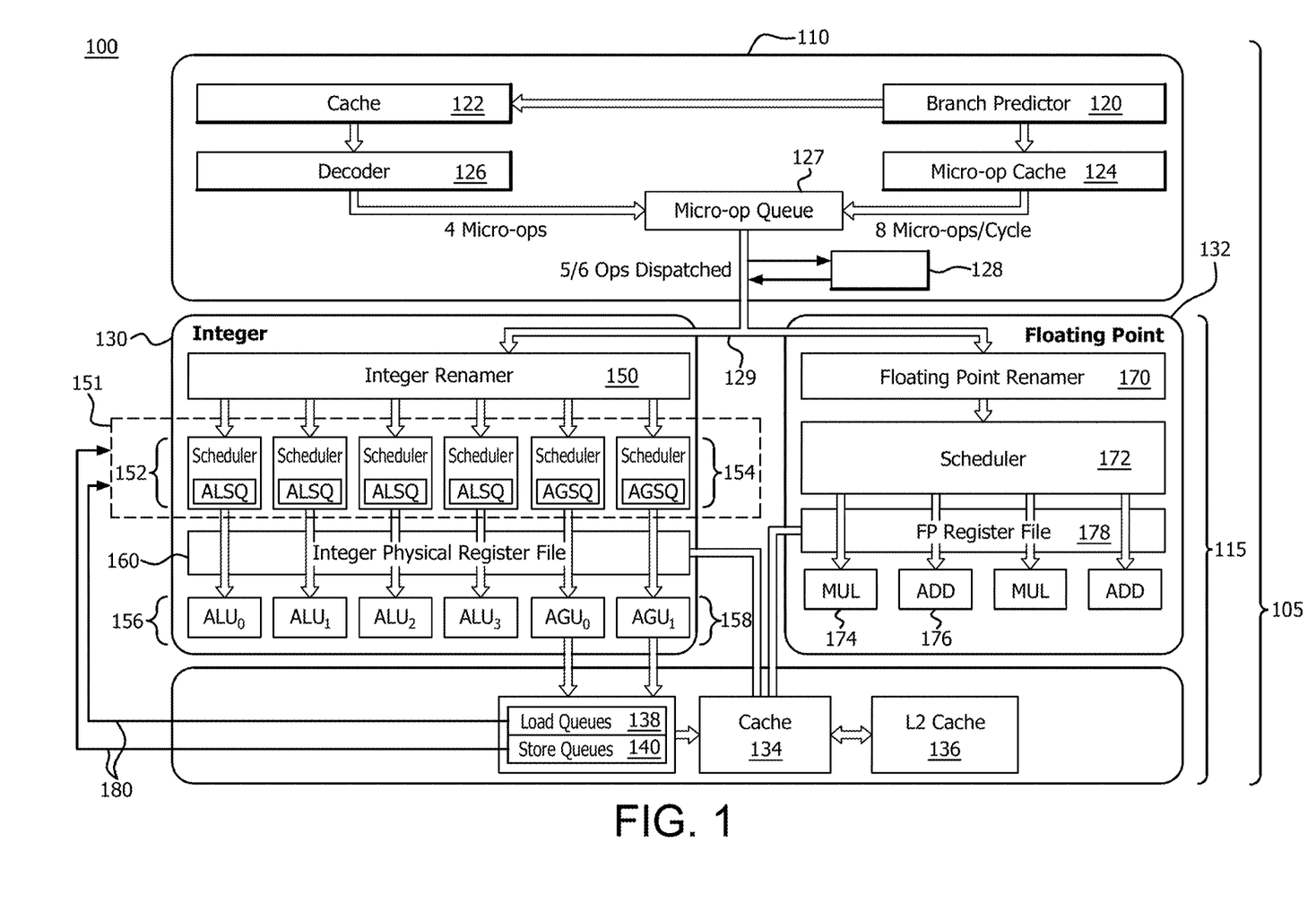
FIG. 1 is a high level block and flow diagram of a core processing unit of a processor in accordance with certain implementations.

FIG. 1 is a high level block and flow diagram of a core processing unit 105 of a processor 100 in accordance with certain implementations. The core processing unit 105 includes a decoder unit 110 which provides micro-operations (shown as micro-ops in FIG. 1) to a scheduler and execution unit (SCEX) 115. The decoder unit 110 includes a branch predictor 120 connected to a cache 122 and a micro-op cache 124. The cache 122 is further connected to a decoder 126. The decoder 126 and the micro-op cache 124 are connected to a micro-op queue 127, which dispatches operations via a dispatch logic 129. A load fusion detection logic (LFDL) 128 is connected to dispatch logic 129.

The SCEX 115 includes an integer SCEX 130 and a floating point SCEX 132, both of which are connected to a cache 134. The cache 134 is further connected to a L2 cache 136, LDQ 138 and STQ 140. The integer SCEX 130 includes an integer renamer 150 which is connected to a scheduler 151, which includes arithmetic logic unit (ALU) scheduler queues (ALSQs) 152 and address generation unit (AGU) scheduler queues (AGSQs) 154. The scheduler 151, and in particular the ALSQs 152 and AGSQs 154, are further connected to $ALU_0$-$ALU_3$ 156 and $AGU_0$-$AGU_1$ 158, respectively. The LDQ 138 and STQ 140 are connected to the scheduler 151 via path 180 to send deallocation signals. The integer SCEX 130 also includes an integer physical file register 160. The floating point SCEX 132 includes a floating point renamer 170, which is connected to a scheduler 172. The scheduler 172 is further connected to multipliers 174 and adders 176. The floating point SCEX 132 also includes a floating point physical file register 178.

A pipelined processor requires a steady stream of instructions to be fed into the pipeline. The branch predictor 120 predicts which set of micro-operations are fetched and executed in the pipelined processor. These micro-operations are fetched and stored in cache 122, which in turn are decoded by the decoder 126. The micro-op cache 124 caches the micro-operations from the branch predictor 120 as the decoder 126 decodes the micro-operations from the cache 122. The micro-op queue 127 stores and queues up the micro-operations from the decoder 126 and micro-op cache 124 for purposes of dispatching the micro-operations for execution via the dispatch logic 129.

In conventional pipeline architecture, each micro-operation is dispatched and handled independently. This may lead to inefficient processing under certain cases. For example, a load micro-operation includes two components: a load/store operation that is directed to a load queue; and an address generation operation that is directed to an AGSQ. Each load micro-operation therefore uses two queue entries and associated processing to complete the load micro-operation.

In accordance with an implementation, the LFDL 128 determines whether adjacent micro-operations are consecutive load micro-operations. The LFDL 128 also confirms whether the consecutive load micro-operations have the same data size and are accessing consecutive addresses. In an implementation, the LFDL 128 checks the addressing mode of each of the load micro-operations. For example for a 4 byte load micro-operation, an addressing mode of the first load micro-operation may use a base register R with a displacement of +4 and an addressing mode of the second load micro-operation may use a base register R with a displacement of +8. In this case, the addresses for the first load micro-operation and the second load micro-operation would be consecutive. That is, the same registers are being used with consecutive constants or offsets for the displacement. In an implementation, the displacement can be positive or negative.

In the event that the load micro-operations have the same data sizes and use consecutive addresses, the LFDL 128 fuses the consecutive load micro-operations into one load micro-operation with two times the data size. In particular, the load micro-operation with the lower address is converted from a load micro-operation with data size x to a load micro-operation with data size 2x and the load micro-operation with the higher address is converted from a load micro-operation with data size x to a load data HI micro-operation whose only purpose is to allocate a destination physical register to hold the load data, but where the load/store micro-operation and address generation micro-operation components are suppressed. The load data HI micro-operation does not use a queue entry in any queues (ALSQs, AGSQs, or LDQ) and only serves as a micro-operation that allocates a physical register to accept the HI portion of the load data returned by the fused load micro-operation with data size 2x. Load fusion leverages the greater bandwidth that is available for larger data size load micro-operations in the load micro-operation with data size 2x.

Both the load micro-operation with data size 2x and the load data HI micro-operation are still allocated destination physical registers. The LFDL 128 provides the destination physical register allocated to the load data HI micro-operation as an additional payload into the load micro-operation with data size 2x. That is, the load micro-operation with data size 2x will have two destination physical registers which it will need to write to, one for LO and for HI.

Figure 2:
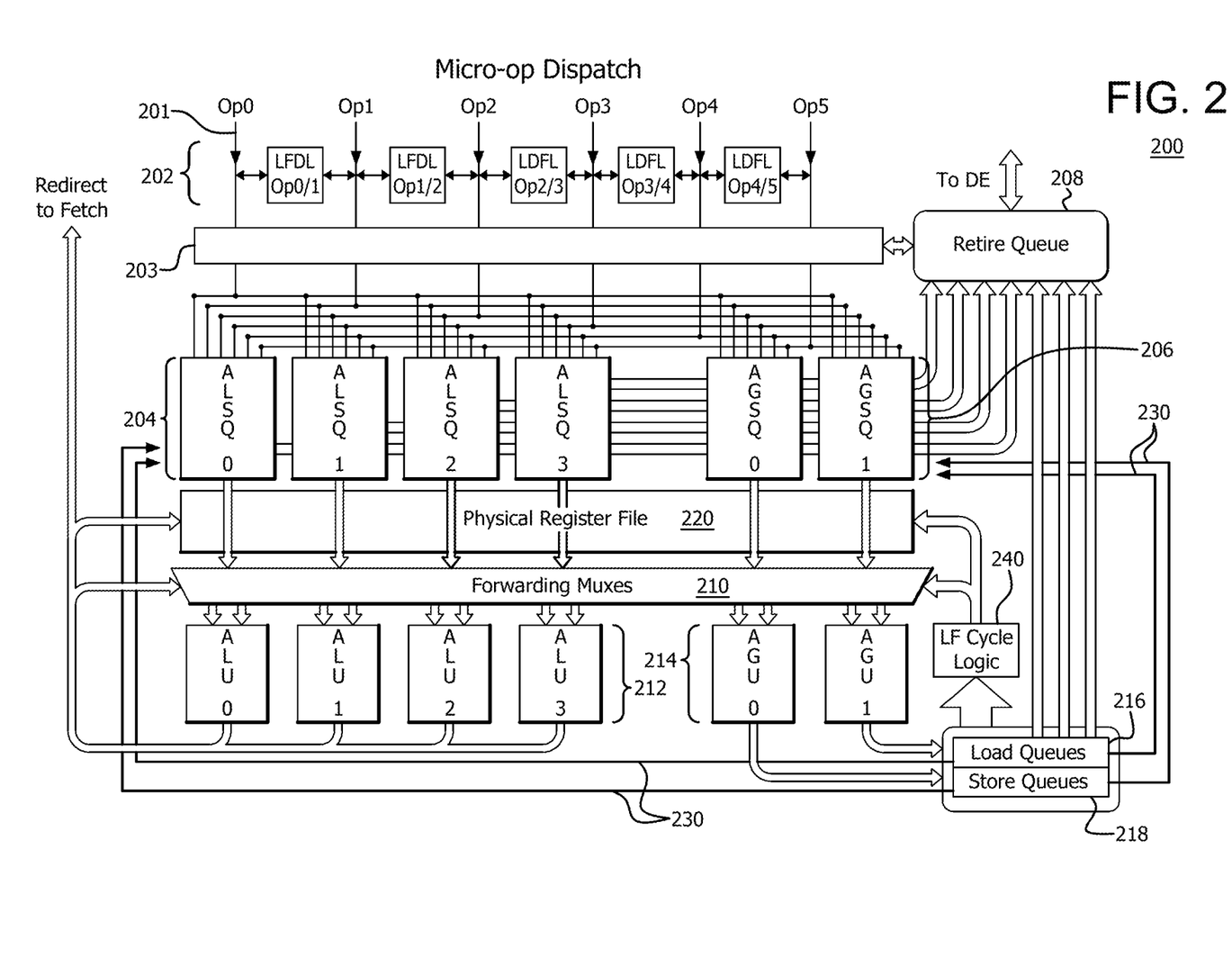
FIG. 2 is a high level block and flow diagram of an integer scheduler and/or execution unit in accordance with certain implementations.

Once the LFDL 128 has fused the consecutive load micro-operations as described herein, the dispatch logic 129 dispatches the load micro-operation with data size 2x to the AGSQs 154. The AGSQs 154 issue the load micro-operation with data size 2x. The LDQ 138 performs the required reads and produces the 2x data size data. Additional logic as shown in FIG. 2 takes the 2x data size data and formats it as appropriate for both the LO and the HI destination physical registers.

In an illustrative example, consider the following two instructions:

MOV R8, [RBX+8] (64 bits datasize)
MOV R9, [RBX+16] (64 bits datasize)

In a conventional architecture, the above two instructions become two load micro-operations:

| | |
|---|---|
| mov.q | r8, [rbx+8] |
| mov.q | r9, [rbx+16] |

In accordance with the load fusion method and system, the two load micro-operations would become:

| | |
|---|---|
| mov.o | r8, [rbx+8] |
| lddatahi.q | r9 | where the first micro-operation is a 128 bit load micro-operation and the second micro-operation is a load data HI only micro-operation. This is an example of a positive displacement.

In another positive address direction illustrative example, the instructions may be a MOV reg, dword [addr] instruction followed by a MOV reg, dword [addr+4] instruction. In this instance, the first load micro-operation loads from a lower address than the second load micro-operation and the two 4 byte load micro-operations are fused into one 8 byte load micro-operation. In particular, the first load micro-operation does use an AGSQ and LDQ queue entry or token and is converted to a load micro-operation with a data size of 64 bits. The second load micro-operation does not use an AGSQ or LDQ queue entry or token and is converted to a load data HI only micro-operation.

In another illustrative example, a negative address direction may be used. For example, a POP32b instruction followed by another POP32b instruction or a MOV reg, dword [addr] followed by a MOV reg, dword [addr-4] instruction. In this instance, the second load micro-operation loads from a lower address than the first load micro-operation and the two 4 byte load micro-operations are fused into one 8 byte load micro-operation. In particular, the first load micro-operation does not use an AGSQ or LDQ queue entry or token and is converted to a load data only micro-operation. The second load micro-operation does use an AGSQ and LDQ queue entry or token and is converted to a load micro-operation with a data size of 64 bits. In another example the instructions may be a POP64b instruction followed by another POP64b instruction or a MOV reg, qword [addr] followed by a MOV reg, qword [addr-8] instruction. This operates similarly except that the data size is doubled from 64 bits to 128 bits.

There are additional considerations or changes in pipeline processing with respect to load fusion. Exception handling changes for fused loads. It is possible that one of the loads should take an architectural or micro-architectural exception, such as a page fault or trap. However, with fused loads, the exception logic doesn't see the loads as independent operations since the exception logic can only detect an exception on the single fused load. The exception logic cannot determine which load architecturally should have taken the exception. This is handled by requiring that the fused load micro-operations are dispatched as an atomic group with an extra bit in the retire queue, for example retire queue 208, indicating a fused load operation. Should a fault or trap occur on the fused load operation, the exception is converted into a resync fault and the instructions are re-executed, and on this re-execution, the load fusion mechanism is temporarily disabled for one dispatch cycle so that they are dispatched without fusing. If the exception recurs, it will now be handled in a conventional manner.

There are additional considerations when implementing load fusion with memory renaming. Without taking these considerations into account, this can result in lost opportunities for memory renaming. For example, without load fusion, a load instruction that exactly matches an older store instruction to the same address would be able to be successfully memory-renamed to the older store. With load fusion, a fused load may not match an older store's address exactly even though the original load and store addresses did match. Without any changes to the memory renaming mechanism, this would lead to an unnecessary memory renaming resync. Load fusion would add complication to the memory renaming logic, so an implementation may choose to avoid doing both memory renaming and load fusion on the same load micro-operation. In one implementation, the memory renaming logic operates after the load fusion logic. If the load fusion logic fuses two adjacent, consecutive load micro-operations, those load micro-operations are ineligible to participate in memory renaming. In another implementation, the memory renaming logic operates before the load fusion logic. If the memory renaming logic renames a load micro-operation, that load micro-operation is ineligible to participate in load fusion.

FIG. 2 is a high level block diagram of the interfaces between dispatch logic 201, LFDL Op 0/1-LFDL Op 4/5 202 and an integer scheduler/execution unit 200 in accordance with certain implementations. In particular, micro-operations Op 0-Op 5 are dispatched via associated dispatch slots in a dispatch logic 201 to the integer scheduler/execution unit 200 and a LFDL Op 0/1-LFDL Op 4/5 202 is connected to the dispatch logic 201 to determine load fusion candidates.

The integer scheduler/execution unit 200 includes an integer renamer/mapper 203 which is connected to $ALSQ_0$-$ALSQ_3$ 204, $AGSQ_0$-$AGSQ_1$ 206 and a retire queue 208. The $ALSQ_0$-$ALSQ_3$ 204 and $AGSQ_0$-$AGSQ_1$ 206 are further connected to forwarding multiplexors 210, which in turn are connected to $ALU_0$-$ALU_3$ 212 and $AGU_0$-$AGU_1$ 214, respectively. The $AGU_0$-$AGU_1$ 214 are connected to LDQ 216 and STQ 218 and retire queue 208. The integer scheduler/execution unit 200 also includes a physical file register 220 which is connected to $ALU_0$-$ALU_3$ 212, LDQ 216 and STQ 218. In particular, LDQ 216 is connected to forwarding multiplexors 210 and physical file register 220 via load fusion cycle logic 240 to account for fused loads. The LDQ 216 and STQ 218 are connected to $AGSQ_0$-$AGSQ_1$ 206 via path 230 to send deallocation signals and to retire queue 208.

Similar to FIG. 1, micro-operations are examined by the LFDL Op 0/1-LFDL Op 4/5 202 to determine whether adjacent micro-operations are consecutive load micro-operations. Adjacent micro-operations refers to micro-operations flowing through adjacent dispatch slots and consecutive load micro-operations refers to both of the adjacent micro-operations being load micro-operations. In particular, LFDL Op 0/1 determines a load fusion candidate from micro-operations 0 and 1, LFDL Op 1/2 determines a load fusion candidate from micro-operations 1 and 2, LFDL Op 2/3 determines a load fusion candidate from micro-operations 2 and 3, LFDL Op 3/4 determines a load fusion candidate from micro-operations 3 and 4, and LFDL Op 4/5 determines a load fusion candidate from micro-operations 4 and 5. Each of LFDL Op 0/1-LFDL Op 4/5 202 also confirms whether the consecutive load micro-operations have the same data size and are accessing consecutive addresses as described herein. The LFDL operates mostly in parallel, checking pairs of adjacent micro-operations independently for load fusion eligibility. However, priority is applied such that the oldest micro-operations are fused first or with higher priority. That is, the micro-operations that are the oldest micro-operations from the pairs of adjacent micro-operations that are eligible for fusing are fused. Furthermore, once a micro-operation is part of a fused load, that micro-operation is ineligible to participate in load fusion for the next-oldest LFDL block. For example, imagine three load micro-operations, dispatched in Op 0, Op 1, and Op 2, all to consecutive bytes (consecutive addresses). Both LFDL Op 0/1 and LFDL Op 1/2 would determine that their respective operations are able to be fused. LFDL Op 0/1 takes priority and fuses Op 0 and Op 1 into a fused load operation. Because Op 1 was part of an older fused load, it is ineligible to be fused with Op 2, so LFDL Op 1/2 is not allowed to fuse Op 1 and Op2 into a fused load operation.

Each of LFDL Op 0/1-LFDL Op 4/5 202 fuses the appropriate load micro-operations into a load micro-operation with two times the data size and a load data HI micro-operation where the load/store micro-operation and address generation micro-operation components are suppressed.

Once each LFDL Op 0/1-LFDL Op 4/5 202 has fused the consecutive load micro-operations as needed, the dispatch logic 201 dispatches the load micro-operation with data size 2x to the $AGSQ_0$-$AGSQ_1$ 206, as appropriate. The $AGSQ_0$-$AGSQ_1$ 206 issue the load micro-operation with data size 2x.

The LDQ 216 performs the required reads. Once the reads are complete, the LDQ 216 sends the load results to the forwarding multiplexors 210 and physical file register 220 via load fusion cycle logic 240. In particular, a 2x data size word is used to send the HI and LO data to the load fusion cycle logic 240. The load fusion cycle logic 240 forwards the LO data with a first destination physical register tag to the forwarding multiplexors 210 and physical file register 220 in a first cycle and sends the HI data with a second destination physical register tag to the forwarding multiplexors 210 and physical file register 220 in a second cycle.

To account for this additional result cycle, the LDQ inserts a bubble in the load pipeline (does not schedule another load micro-operation to use the load pipeline) in the cycle immediately following the fused load micro-operation. This allows the fused load micro-operation to use the additional cycle to broadcast the HI load result data without a collision with a subsequent load micro-operation.

Figure 3:
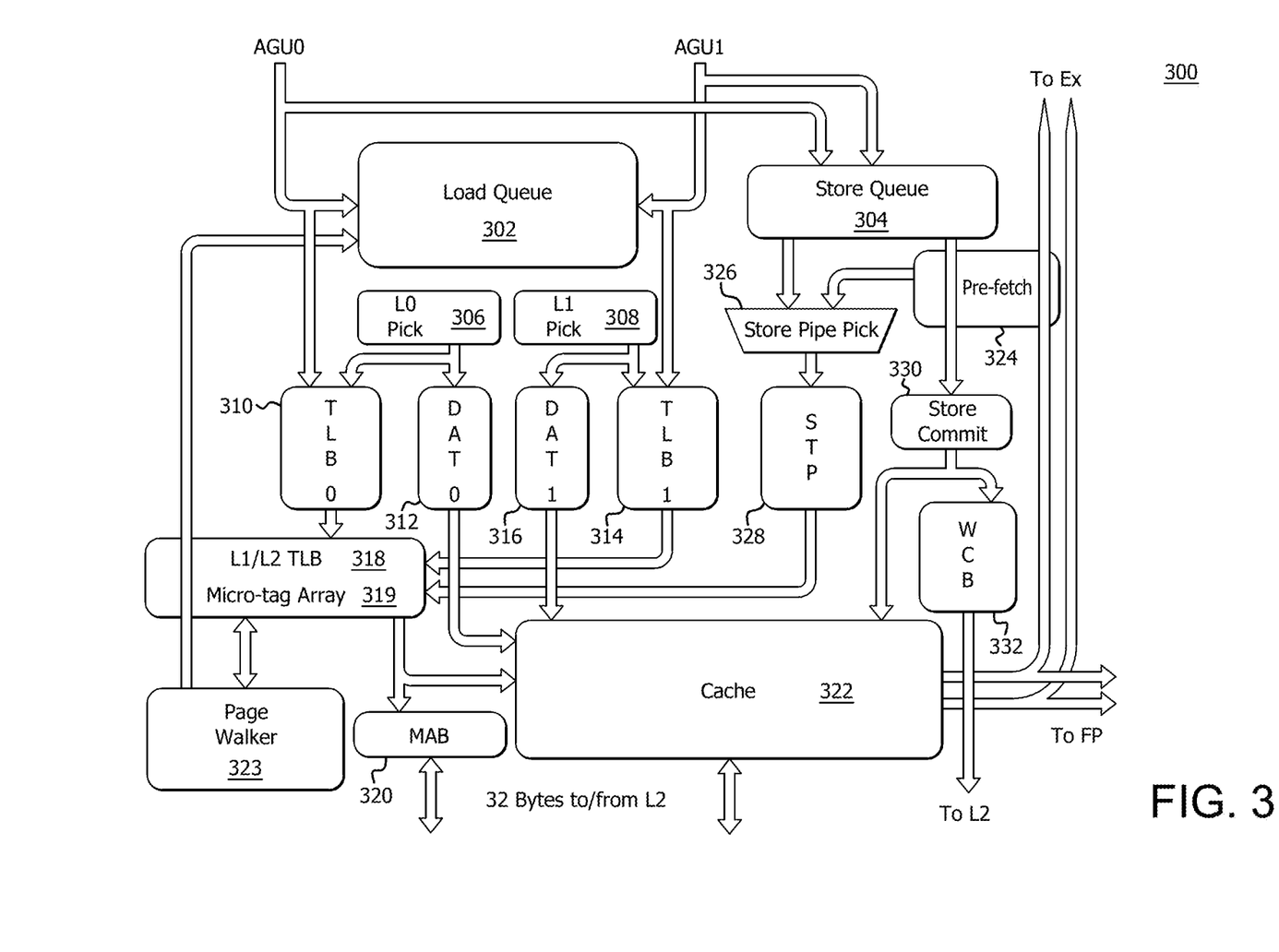
FIG. 3 is a high level block and flow diagram of a load-store/data cache (LSDC) unit in accordance with certain implementations.

FIG. 3 is a high level block and flow diagram of a load-store/data cache (LSDC) unit 300 in accordance with certain implementations and functions as described herein for FIGS. 1 and 2. The LSDC unit 300 includes an LDQ 302, a STQ 304, a load 0 (L0) picker 306 and a load 1 (L1) picker 308. The L0 picker 306 is connected to a translation lookaside buffer (TLB) and micro-tag access pipeline 0 (TLB0) 310 and a data cache access pipeline (data pipe 0) 312. The L1 picker 308 is connected to a translation lookaside buffer (TLB) and micro-tag access pipeline 1 (TLB1) 314 and a data cache access pipeline (data pipe 1) 316. The TLB0 310 and TLB1 314 are further connected to L1/L2 TLB 318, a page walker 323, and micro-tag array 319, which in turn is connected to a miss address buffer (MAB) 320, and assists in reading data from a cache 322. The data pipe 0 312 and data pipe 1 316 are connected to the cache 322. The STQ 304 is connected to a pre-fetcher 324 and a store pipe picker 326, which in turn is connected to a store pipeline (STP) 328. The STP 328 is also connected to the L1/L2 TLB 318 and the micro-tag array 319. The STQ 304 is further connected to a store commit pipeline 330, which in turn is connected to a write combining buffer (WCB) 332 and the cache 322.

Figure 4:
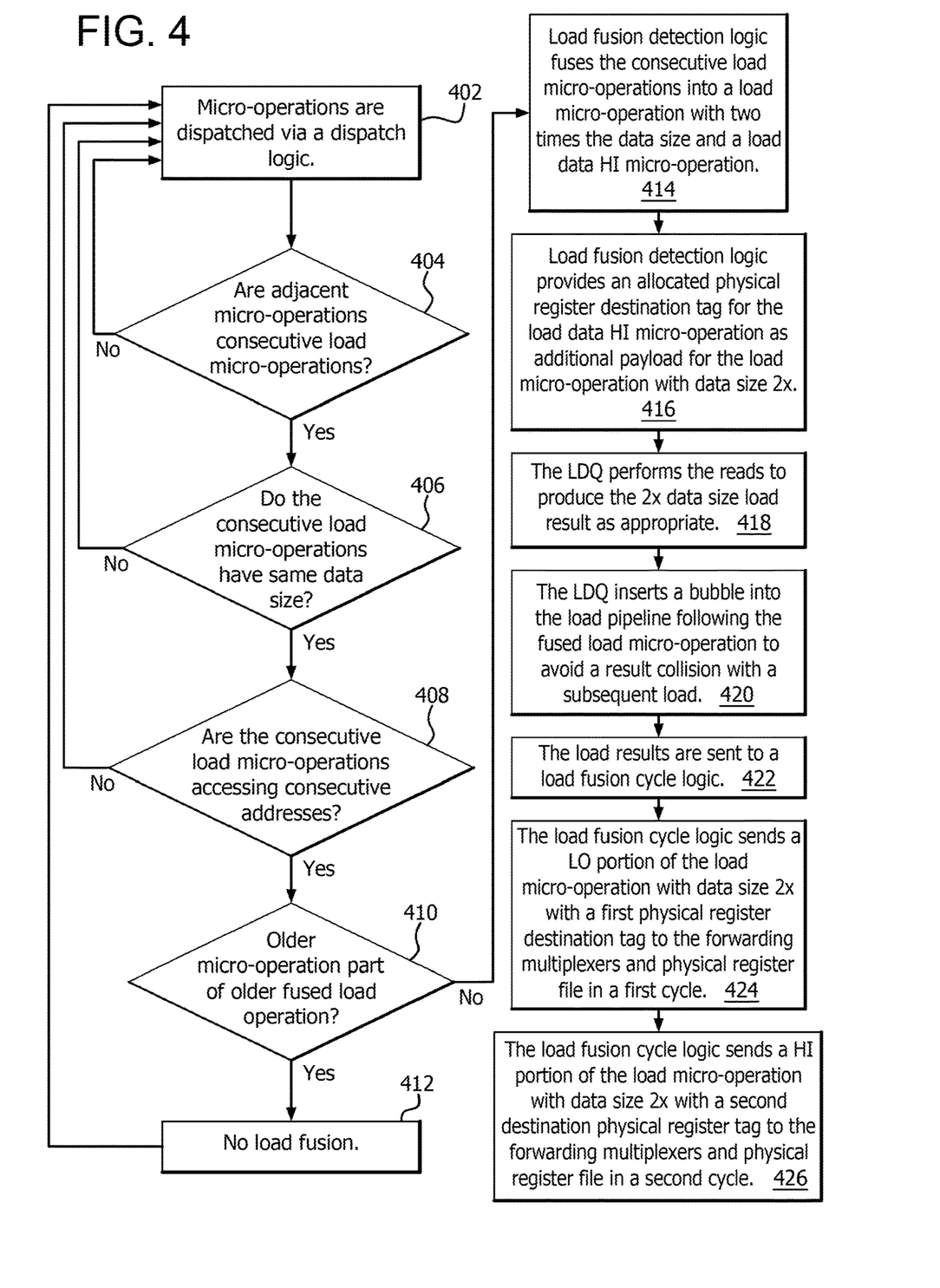
FIG. 4 is a flow diagram of a method for load fusion in accordance with certain implementations.

FIG. 4 is a flow diagram of a method for load fusion in accordance with certain implementations. Micro-operations are dispatched via a dispatch logic (step 402). A load fusion detection logic detects whether adjacent micro-operations are consecutive load micro-operations (step 404). If the adjacent micro-operations are not consecutive load micro-operations, then review the next set of dispatched micro-operations (step 402). If the adjacent micro-operations are consecutive load micro-operations, then the load fusion detection logic determines whether the consecutive load micro-operations have the same data size (step 406). If the consecutive load micro-operations are not the same size, then review the next set of dispatched micro-operations (step 402). If the consecutive load micro-operations are the same size, then the load fusion detection logic determines whether the consecutive load micro-operations are accessing consecutive addresses (step 408). If the consecutive load micro-operations are not accessing consecutive addresses, then review the next set of dispatched micro-operations (step 402). If the consecutive load micro-operations are accessing consecutive addresses, then the load fusion detection logic determines if an older micro-operation of the two micro-operations under consideration are part of an older fused load operation (step 410). If part of an older fused load operation, no load fusion is done (step 412) and review the next set of dispatched micro-operations (step 402). If not part of an older fused load operation, the load fusion detection logic fuses the consecutive load micro-operations into a load micro-operation with two times the data size and a load data HI micro-operation (step 414).

The load fusion detection logic provides an allocated physical register destination tag for the load data HI micro-operation as additional payload for the load micro-operation with data size 2x (step 416). The LDQ performs the reads to produce the 2x data size load result as appropriate (step 418). The LDQ inserts a bubble into the load pipeline following the fused load micro-operation to avoid a result collision with a subsequent load (step 420). The load results are sent to a load fusion cycle logic (step 422). The load fusion cycle logic sends a LO portion of the load micro-operation with data size 2x with a first physical register destination tag to the forwarding multiplexers and physical register file in a first cycle (step 424). The load fusion cycle logic sends a HI portion of the load micro-operation with data size 2x with a second physical register destination tag to the forwarding multiplexers and physical register file in a second cycle (step 426). The order of operations is illustrative only. Other orders can be used with respect to certain of the operations.

Figure 5:
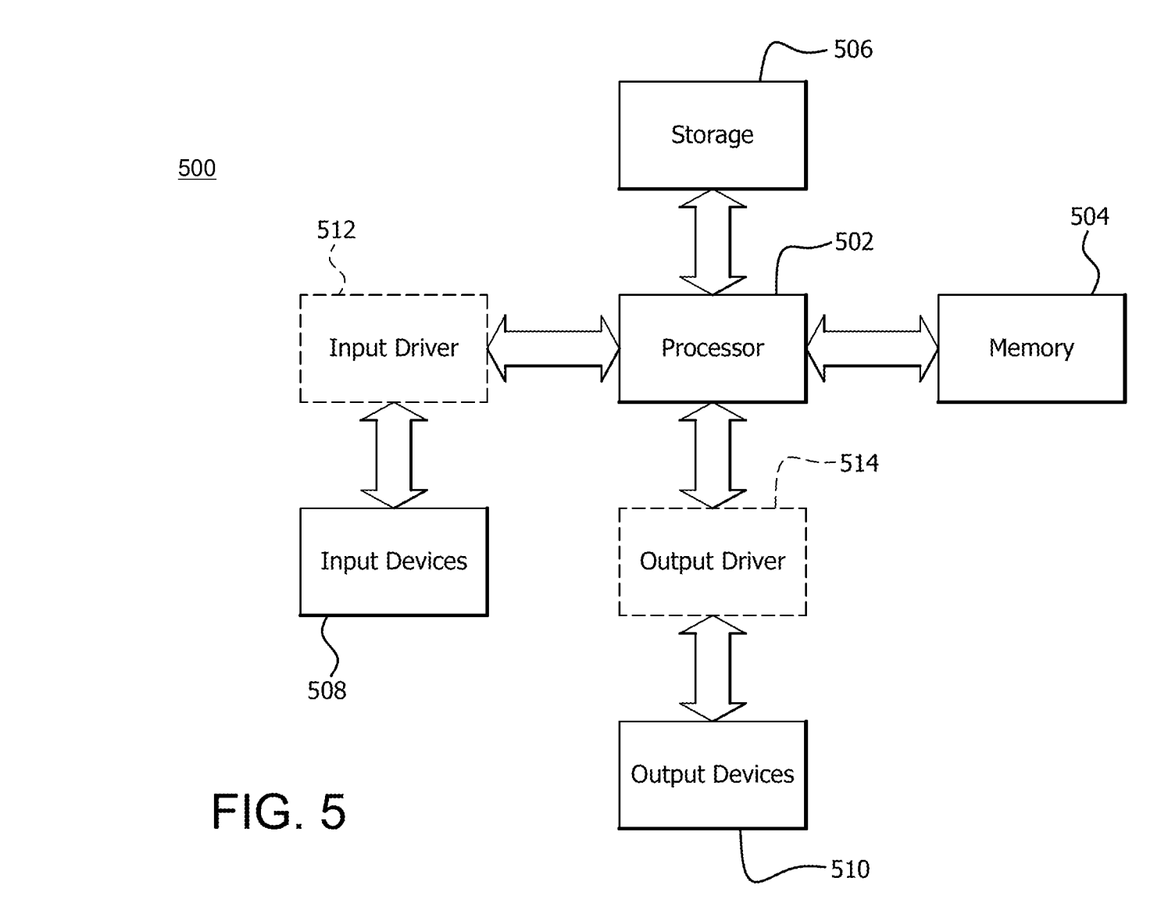
FIG. 5 is a block diagram of an example device in which one or more disclosed implementations may be implemented.

FIG. 5 is a block diagram of an example device 500 in which one or more portions of one or more disclosed examples are implemented. The device 500 includes, for example, a head mounted device, a server, a computer, a gaming device, a handheld device, a set-top box, a television, a mobile phone, or a tablet computer. The device 500 includes a compute node or processor 502, a memory 504, a storage 506, one or more input devices 508, and one or more output devices 510. The device 500 also optionally includes an input driver 512 and an output driver 514. It is understood that the device 500 includes additional components not shown in FIG. 5.

The compute node or processor 502 includes a central processing unit (CPU), a graphics processing unit (GPU), a CPU and GPU located on the same die, or one or more processor cores, wherein each processor core may be a CPU or a GPU. The memory 504 is located on the same die as the compute node or processor 502, or is located separately from the compute node or processor 502. In an implementation, the memory 504 includes a volatile or non-volatile memory, for example, random access memory (RAM), dynamic RAM, or a cache.

The storage 506 includes a fixed or removable storage, for example, a hard disk drive, a solid state drive, an optical disk, or a flash drive. The input devices 508 include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 510 include a display, a speaker, a printer, a haptic feedback device, one or more lights, an antenna, or a network connection (e.g., a wireless local area network card for transmission and/or reception of wireless IEEE 802 signals).

The input driver 512 communicates with the compute node or processor 502 and the input devices 508, and permits the compute node or processor 502 to receive input from the input devices 508. The output driver 514 communicates with the compute node or processor 502 and the output devices 510, and permits the processor 502 to send output to the output devices 510. It is noted that the input driver 512 and the output driver 514 are optional components, and that the device 500 will operate in the same manner if the input driver 512 and the output driver 514 are not present.

In general, a method for fusing load micro-operations includes determining whether adjacent micro-operations are consecutive load micro-operations, where adjacent micro-operations refers to micro-operations flowing through adjacent dispatch slots and consecutive load micro-operations refers to both of the adjacent micro-operations being load micro-operations. The method further includes determining whether the consecutive load micro-operations have a same data size, determining whether the consecutive load micro-operations are accessing consecutive addresses and fusing the consecutive load micro-operations into a load micro-operation with twice the data size and a load data only micro-operation. In an implementation, the load data only micro-operation suppresses use of load queue entries and address generation scheduler queue entries. In an implementation, the method further includes reviewing an addressing mode of each of the consecutive micro-operations. In an implementation, the consecutive load micro-operation having a lower address is converted to the load micro-operation with twice the data size. In an implementation, the consecutive load micro-operation having a higher address is converted to the load data only micro-operation. In an implementation, the method further includes marking fused loads as ineligible for memory renaming when memory renaming operates after load fusion. In an implementation, the method further includes marking a memory renamed load micro-operation as ineligible when memory renaming operates before load fusion. In an implementation, an occurrence of an exception with respect to at least one of the load micro-operation with twice the data size and the load data only micro-operation results in re-execution of the adjacent micro-operations without fusing. In an implementation, the method further includes providing an allocated destination physical register tag for the load data only micro-operation as additional payload for the load micro-operation with data size 2x. In an implementation, the method further includes sending a LO portion of load results with a destination physical register tag in a first cycle and sending a HI portion of the load results with a destination physical register tag of the load data only micro-operation in a second cycle. In an implementation, the method further includes inserting a bubble into a load pipeline on a cycle immediately following a fused load micro-operation to allow the fused load micro-operation an extra cycle to process a HI portion of load results.

In general, a processor for fusing load micro-operations includes a dispatch logic configured to dispatch micro-operations and a load fusion detection logic connected to the dispatch logic. The load fusion detection logic is configured to determine whether adjacent micro-operations are consecutive load micro-operations, where the adjacent micro-operations refers to micro-operations flowing through adjacent dispatch slots and the consecutive load micro-operations refers to both of the adjacent micro-operations being load micro-operations. The load fusion detection logic is further configured to determine whether the consecutive load micro-operations have a same data size, determine whether the consecutive load micro-operations are accessing consecutive addresses and fuse the consecutive load micro-operations into a load micro-operation with twice the data size and a load data only micro-operation. In an implementation, the load data only micro-operation suppresses use of load queue entries and address generation scheduler queue entries. In an implementation, the load fusion detection logic is configured to convert the consecutive load micro-operation having a lower address to the load micro-operation with twice the data size and the consecutive load micro-operation having a higher address to the load data only micro-operation. In an implementation, the processor is further configured to mark fused loads as ineligible for memory renaming when memory renaming operates after load fusion. In an implementation, the processor is further configured to mark a memory renamed load micro-operation as ineligible when memory renaming operates before load fusion. In an implementation, an occurrence of an exception with respect to at least one of the load micro-operation with twice the data size and the load data only micro-operation results in re-execution of the adjacent micro-operations without fusing. In an implementation, the load fusion detection logic is configured to provide an allocated destination physical register tag for the load data only micro-operation as additional payload for the load micro-operation with data size 2x. In an implementation, the processor further includes a load fusion cycle logic configured to send a LO portion of load results with a destination physical register tag in a first cycle and send a HI portion of the load results with a destination physical register tag of the load data only micro-operation in a second cycle. In an implementation, the load fusion detection logic is configured to insert a bubble into a load pipeline on a cycle immediately following a fused load micro-operation to allow the fused load micro-operation an extra cycle to process a HI portion of load results.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for converting load micro-operations, the method comprising:

converting, by conversion circuitry, two adjacent micro-operations, which are consecutive load micro-operations, each having a data size that is the same, and which access consecutive addresses, into a load micro-operation with twice the data size and a load data only micro-operation, wherein the load data only micro-operation allocates a destination physical register to which to write data loaded by the load micro-operation with twice the data size; and executing, by execution circuitry, the load micro operation with twice the data size.

2. The method of claim 1, wherein the load data only micro-operation suppresses use of load queue entries and address generation scheduler queue entries.

3. The method of claim 1, further comprising:
reviewing an addressing mode of each the two adjacent micro-operations.

4. The method of claim 1, wherein of the two adjacent micro-operations, a micro-operation having a lower address is converted to the load micro-operation with twice the data size.

5. The method of claim 4, wherein of the two adjacent micro-operations, a micro-operation having a higher address is converted to the load data only micro-operation.

6. The method of claim 1, further comprising:
marking converted loads as ineligible for memory renaming if memory renaming operates after load conversion.

7. The method of claim 1, further comprising:
marking a memory renamed load micro-operation as ineligible if memory renaming operates before load conversion.

8. The method of claim 1, wherein an occurrence of an exception with respect to at least one of the load micro-operation with twice the data size and the load data only micro-operation results in re-execution of the two adjacent micro-operations without conversion.

9. The method of claim 1, further comprising:
providing an allocated destination physical register tag for the load data only micro-operation as additional payload for the load micro-operation with twice the data size.

10. The method of claim 9, further comprising:
sending a LO portion of load results with a destination physical register tag in a first cycle; and
sending a HI portion of the load results with a destination physical register tag of the load data only micro-operation in a second cycle.

11. The method of claim 1, further comprising:
inserting a bubble into a load pipeline on a cycle immediately following a converted load micro-operation to allow the converted load micro-operation an extra cycle to process a HI portion of load results.

12. A processor configured to convert load micro-operations, comprising:

dispatch circuitry configured to dispatch micro-operations; and load conversion circuitry in communication with the dispatch circuitry, the load fusion conversion circuitry configured to:

convert two adjacent micro-operations, which are consecutive load micro-operations, each having a data size that is the same, and which access consecutive addresses, into a load micro-operation with twice the data size and a load data only micro-operation, wherein the load data only micro-operation allocates a destination physical register to which to write data loaded by the load micro-operation with twice the data size; and execution circuitry configured to execute the load micro-operation with twice the data size.

13. The processor of claim 12, wherein the load data only micro-operation suppresses use of load queue entries and address generation scheduler queue entries.

14. The processor of claim 12, wherein the load conversion circuitry is configured to convert a micro-operation of the two adjacent micro-operations having a lower address to the load micro-operation with twice the data size and to convert a micro-operation of the two adjacent micro-operations having a higher address to the load data only micro-operation.

15. The processor of claim 12, wherein the processor is further configured to mark converted loads as ineligible for memory renaming when memory renaming operates after load conversion.

16. The processor of claim 12, wherein the processor is further configured to mark a memory renamed load micro-operation as ineligible when memory renaming operates before load conversion.

17. The processor of claim 12, wherein an occurrence of an exception with respect to at least one of the load micro-operation with twice the data size and the load data only micro-operation results in re-execution of the two adjacent micro-operations without conversion.

18. The processor of claim 12, wherein the load conversion detection logic is configured to provide an allocated destination physical register tag for the load data only micro-operation as additional payload for the load micro-operation with twice the data size.

19. The processor of claim 12, further comprising:
a load conversion cycle logic, the load conversion cycle logic configured to:
send a LO portion of load results with a destination physical register tag in a first cycle; and
send a HI portion of the load results with a destination physical register tag of the load data only micro-operation in a second cycle.

20. The processor of claim 12, wherein the load conversion circuitry is configured to insert a bubble into a load pipeline on a cycle immediately following a converted load micro-operation to allow the converted load micro-operation an extra cycle to process a HI portion of load results.

* * * * *